United States Patent
Stobrawe et al.

(10) Patent No.: US 6,951,104 B2
(45) Date of Patent: Oct. 4, 2005

(54) HYDRAULIC PISTON-AND-CYLINDER ARRANGEMENT

(75) Inventors: Herbert Stobrawe, Ebensfeld (DE); Christian Sperber, Rentweinsdorf (DE)

(73) Assignee: FTE Automotive GmbH & Co. KG (DE)

(*) Notice: Subject to any disclaimer, the term of this patent is extended or adjusted under 35 U.S.C. 154(b) by 143 days.

(21) Appl. No.: 10/449,813

(22) Filed: May 30, 2003

(65) Prior Publication Data

US 2004/0007125 A1 Jan. 15, 2004

(30) Foreign Application Priority Data

Jun. 3, 2002 (DE) .................................. 202 08 568 U

(51) Int. Cl.[7] .............................................. B60T 17/22
(52) U.S. Cl. ........................................ 60/534; 60/589
(58) Field of Search .................... 60/534, 587, 589; 92/5 R

(56) References Cited

U.S. PATENT DOCUMENTS

| 4,705,151 A | | 11/1987 | Leigh-Monstevens et al. | |
| 4,914,916 A | * | 4/1990 | Leigh-Monstevens et al. | 60/534 |
| 6,564,694 B2 | * | 5/2003 | Zumberge et al. | 92/5 R |
| 6,584,771 B2 | * | 7/2003 | Keller et al. | 60/588 |
| 6,619,039 B2 | * | 9/2003 | Zehnder et al. | 60/534 |
| 6,732,517 B2 | * | 5/2004 | Zehnder et al. | 60/534 |

FOREIGN PATENT DOCUMENTS

| DE | 41 20 643 A1 | 12/1992 |
| DE | 199 15 832 A1 | 7/2000 |
| DE | 201 01 049 U1 | 5/2001 |
| DE | 201 16 818 U1 | 2/2002 |
| GB | 2256907 A | 12/1992 |

\* cited by examiner

*Primary Examiner*—Edward K. Look
*Assistant Examiner*—Michael Leslie
(74) *Attorney, Agent, or Firm*—McAndrews Held & Malloy, Ltd.

(57) ABSTRACT

A hydraulic piston-and-cylinder arrangement has a piston to which a signal element is assigned and which is accepted movably in a longitudinal direction in a cylinder housing, at which a position sensor is secured, by means of which an axial position of the signal element and therefore of the piston in the cylinder housing can be sensed. The signal element is fitted to the piston by means of a holding cap. As a result, a hydraulic piston-and-cylinder arrangement with a device for sensing the piston position is created, in which the signal element of the sensing device, which signal element operates in conjunction with the position sensor on the cylinder housing, can be fixed in a simple manner on the piston, which also permits a sizing of the signal element largely independent of the piston geometry.

20 Claims, 3 Drawing Sheets

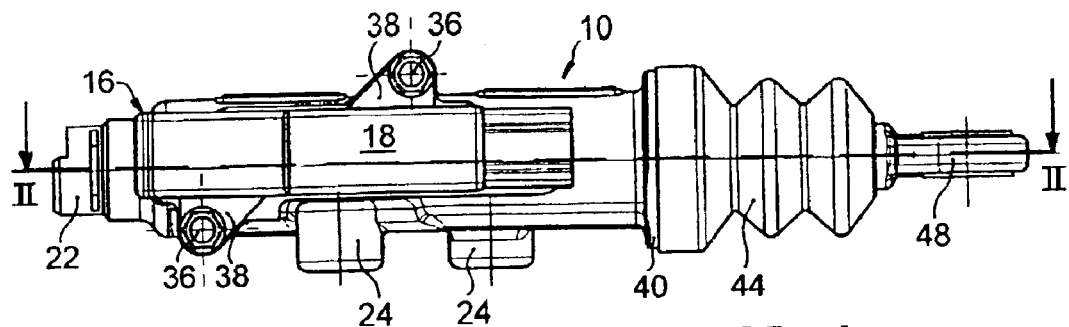
FIG. 1
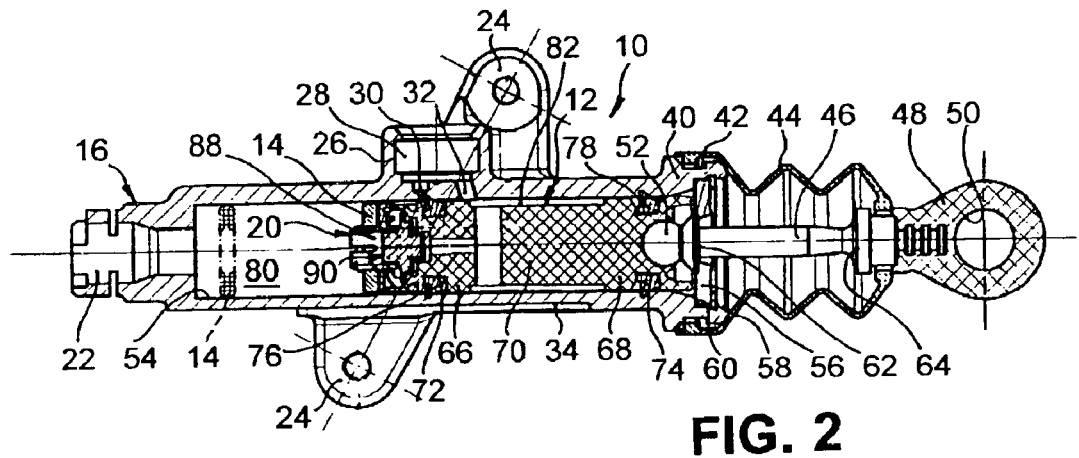
FIG. 2
FIG. 3
FIG. 4

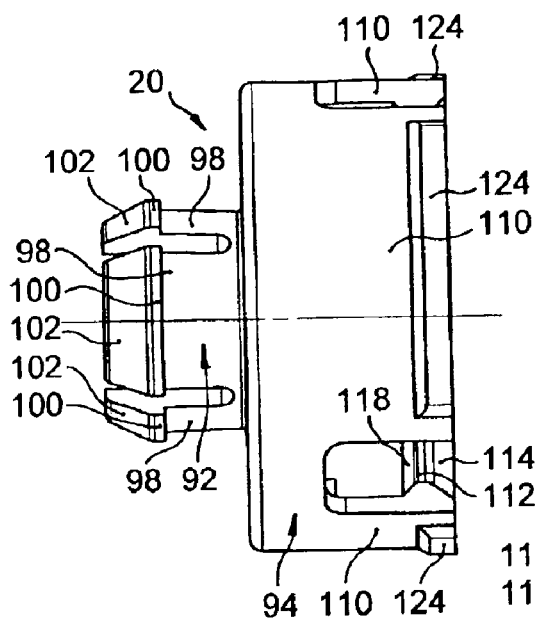
FIG. 5
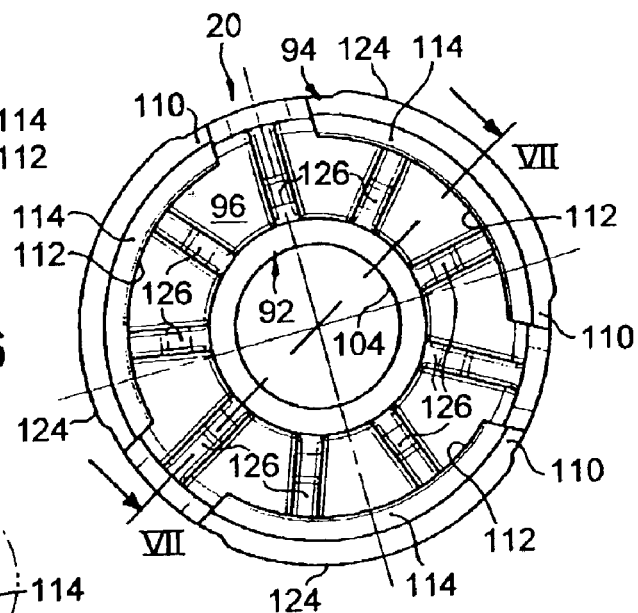
FIG. 6
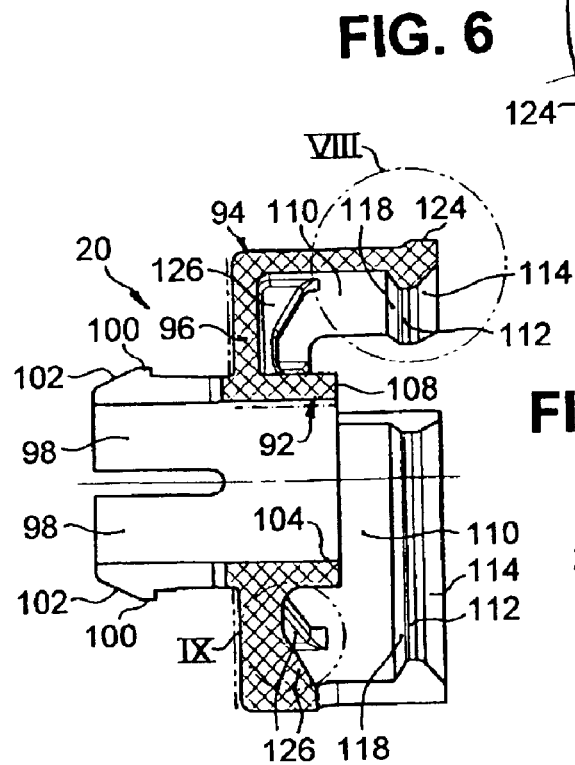
FIG. 7
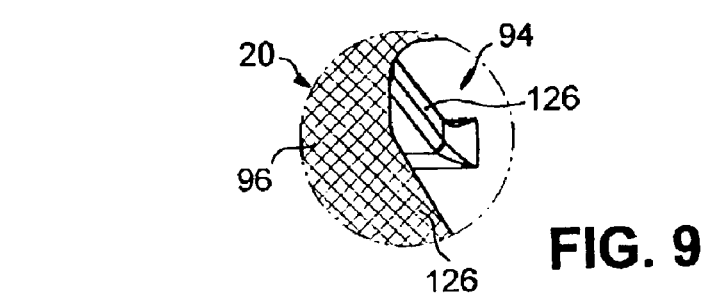
FIG. 8
FIG. 9

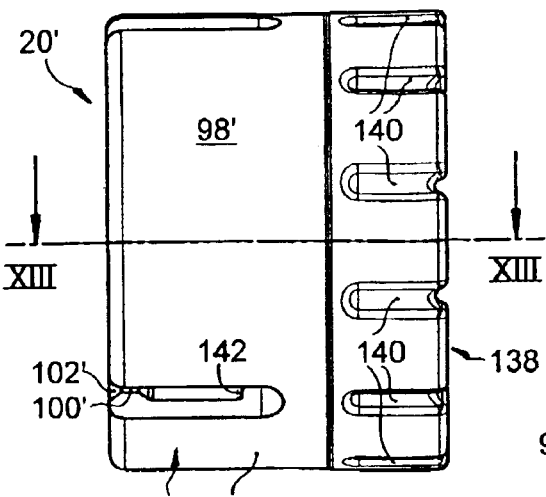
FIG. 10
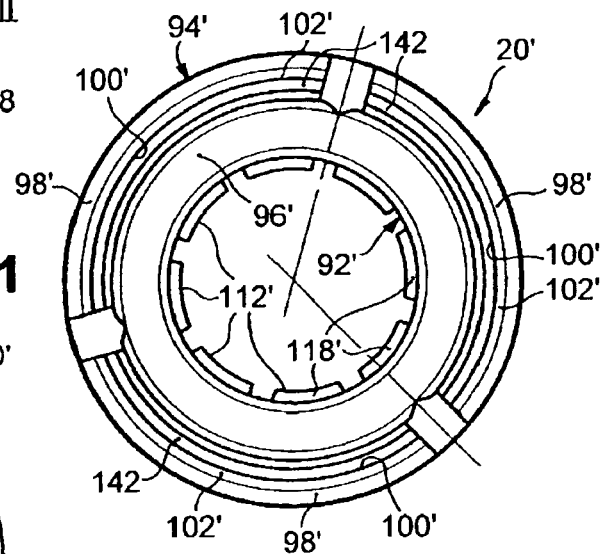
FIG. 12
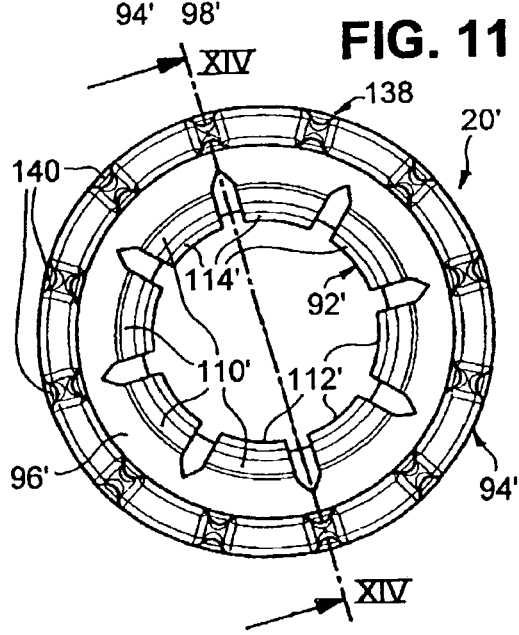
FIG. 11
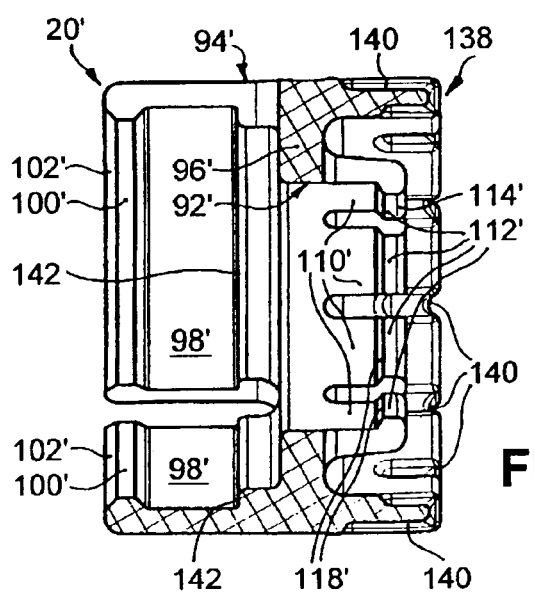
FIG. 13
FIG. 14

HYDRAULIC PISTON-AND-CYLINDER ARRANGEMENT

FIELD OF THE INVENTION

The invention relates to a hydraulic piston-and-cylinder arrangement. The invention relates in particular to a master or slave cylinder for a hydraulic clutch control for motor vehicles, very large volumes of which cylinders are used in the automobile industry.

BACKGROUND OF THE INVENTION

A conventional hydraulic clutch control for motor vehicles has a master cylinder connected with a compensating tank filled with hydraulic fluid, which cylinder can be actuated via a clutch pedal or an electric motor drive. The master cylinder is hydraulically connected via a pressure pipe with a slave cylinder, so that the pressure generated in the master cylinder when the clutch pedal is depressed, or when the master cylinder piston is displaced by the electric motor, can be transmitted via the liquid column in the pressure pipe to the slave cylinder. As a result the release bearing of the clutch is subjected to an actuating force via the slave cylinder piston, in order to separate the clutch pressure plate from the clutch carrier plate via a disengaging mechanism and therefore the engine from the gear unit of the motor vehicle. Hydraulic clutch controls are also known, in which the clutch disengaging mechanism can be actuated from an operating or slave cylinder operatively connected with it, which is in turn controlled via a hydraulic servo circuit.

DESCRIPTION OF THE PRIOR ART

With such hydraulic clutch controls for motor vehicles it has already been suggested in the state of the art, that the position of the piston for the master or slave cylinder be sensed using suitable mechanical, electrical or magnetic devices (e.g. U.S. Pat. No. 4,705,151, DE 41 20 643 A1, DE 199 15 832 A1, DE 201 16 818 U1), in order to indirectly obtain information about the position of the clutch pressure plate. Such sensing permits, on the one hand, a statement to be made about the state of wear on the clutch. On the other hand the engaging respectively disengaging state of the clutch can be determined, so that, for example, the clutch operation can be automatically controlled to the desired extent in the case of automatic friction clutches. The results of the sensing can then also be used for safety measures whilst the motor vehicle is in operation, so that, for example, the motor vehicle can only be started once the clutch pedal has been depressed.

In this connection the generic DE 199 15 832 A1 discloses a master cylinder which has a piston arranged movably in the longitudinal direction in a housing. A ring groove is formed on the piston and serves to accept an annular magnet. A receiving part sits on the master cylinder housing in which receiving part two Hall-effect switches, associated evaluator electronics as well as a connecting contact component are arranged. Using the Hall-effect switches the position of the annular magnet and therefore the position of the piston is sensed through the wall of the cylinder housing, whereupon the corresponding switch signal is conditioned by the evaluator electronics and then supplied to the outside via the connecting contact component for further processing. DE 199 15 832 A1 also mentions in a general manner the fact that if the piston is not magnetic and is manufactured from plastic material, for example, the annular magnet can be molded in or clipped in. A concrete form of such a connection however cannot be assumed from this state of the art.

Furthermore, a disadvantage of this state of the art is that, with the arrangement of the annular magnet in a ring groove of the piston, which arrangement is disclosed here in concrete form, the annular magnet can only have one specific cross-section and therefore only one definite, rather low, magnetic field strength, so that the correct sensing of the annual magnet by means of the Hall-effect switches through the wall of the cylinder housing may present difficulties in some instances.

Finally, DE 201 01 049 U1 also discloses a (pneumatic) working cylinder whose piston bears an annular magnet that can be sensed by means of a reed switch.

Starting with the state of the art according to DE 199 15 832 A1 the object of the invention is to create a hydraulic cylinder with a device for detecting the piston position, in which a signal element of the sensing device operating in conjunction with the position sensor on the cylinder housing can simply be fixed to the piston and in a manner which avoids the disadvantages of the state of the art.

SUMMARY OF THE INVENTION

According to the invention in the case of a hydraulic piston-and-cylinder arrangement, in particular a master or slave piston-and-cylinder arrangement for a hydraulic clutch control for motor vehicles, which comprises a piston, which has a signal element and is accepted movably in a longitudinal direction in a cylinder housing, to which a position sensor is secured, by means of which sensor an axial position of the signal element and therefore of the piston in the cylinder housing can be sensed, the signal element is secured to a holding cap, which in turn is fitted to the piston.

Due to the fact that the signal element is not fitted directly to the piston but connected by means of an additional holding cap with the piston, the signal element can advantageously be created largely independent of the piston geometry and therefore in a very flexible manner. It is therefore possible to select the signal element, depending on the respective requirements, with respect to its dimensions and/or its shape such that a signal level is guaranteed which is always sufficient and can be sensed by the position sensor at all events. If the signal element is a permanent magnet, for example, preferably a cost-effective, ferro-magnetic annular magnet, then with the same magnet material the magnetic characteristics (magnetic field strength, magnetic flux density respectively demagnetising factor) can be influenced simply.

A further advantage of the holding cap connecting the signal element with the piston is that it permits economic modular assembly solutions. For example, the same holding cap can be used on pistons of various lengths, in order to create piston assemblies which permit a stroke in accordance with the respective requirements.

It is fundamentally possible to fit the holding cap at the end of the piston facing away from the pressure compartment of the hydraulic cylinder. However, in order to simplify assembly in particular, a fitting of the holding cap to a pressure compartment-side face surface of the piston is preferred. With this fitting location and in the case of a master cylinder there need not be any concern that a thrust bolt for actuating the piston can penetrate the holding cap.

The holding cap may be fitted to the piston using a snap connection. A snap connection is given preference inter alia over other types of connection, such as a screw or glued connection, because it makes assembly easier especially in mass production. The same applies, where the signal element is secured to the holding cap using a snap connection. Here, it is useful that the holding cap has an inner hub section and an outer hub section connected to it via a ring section, each hub section having a plurality of snap segments, by means of which the signal element is secured to the holding cap respectively the holding cap is fitted to the piston.

Each snap segment may have a nose on the end side projecting radially inwards or outwards which engages in a form-locking manner in a radial groove provided on the piston and grips behind the signal element, respectively, thus creating the snap connection in a simple fashion. If the nose of the respective snap segment, which nose engages in a form-locking manner in the radial groove provided on the piston, is provided with a bevel on its side facing away from the piston, an undesired axial play which may otherwise exist is prevented in a simple manner.

The piston may have, as is known (see, for example, DE 37 38 741 A1), a central suction valve with a valve body, the valve body being held on the piston using the holding cap. The holding cap therefore fulfils two functions advantageously: On the one hand it serves to secure the signal element to the piston, on the other hand it supports the valve body of the central suction valve. Here, the inner hub section of the holding cap preferably has a guide section for guiding the valve body, which usefully encompasses concentrically a cylindrical extension of the valve body with little radial play. The guide section of the holding cap may also have a face surface, which preferably forms a stop for the valve body in its suction position.

The piston may variably delimit a pressure compartment in the cylinder housing and may have a sliding surface for a housing-side sealing element, which in an operating position of the piston seals the pressure compartment, the holding cap here being provided with a known after-running device (cf. DE 100 28 673 A1 of the applicant), which, when the piston is in a normal position, connects the pressure compartment underneath the sealing element respectively through it with an after-running area. Even with this embodiment variant for so-called "plunger pistons", in which the pressure compartment-side sealing element is arranged housing-tight, the holding cap therefore fulfils two functions advantageously. On the one hand, it holds the signal element on the piston; on the other hand, it provides for the required after-running device. Here, the outer hub section of the holding cap usefully has a cylindrical outer peripheral surface abutted by the sealing element when the piston is in the normal position and provided with several equalizing grooves distributed over the periphery, which grooves extend in an axial direction underneath the sealing element when the piston is in the normal position.

Finally, it is fundamentally possible to form the holding cap from a suitable non-ferrous metal by machining, for example. From the point of view of manufacture in particular, however, it is preferable, for the holding cap to be made of plastic, preferably injection-molded of plastic. The holding cap can then be manufactured in a cost-effective manner without the need for finishing tools, in other words without the need for costly finishing steps. The use of plastic as a material for the holding cap also has the advantage, that the holding cap has no screening effect which might be detrimental to the correct detection of the axial position of the, for example, magnetic signal element by means of the, for example, inductive position sensor or a position sensor provided with a Hall-effect sensor. Not least the use of plastic as holding cap material also brings weight advantages with it.

BRIEF DESCRIPTION OF THE DRAWINGS

For a better understanding of the invention and to show how the same may be carried into effect, reference will now be made, by way of example, to the accompanying drawings, in which:

FIG. 1 is a plan view of a hydraulic cylinder to which a position sensor of a device for detecting the axial piston position is fitted, FIG. 2 is a sectional view of the hydraulic cylinder in accordance with FIG. 1 along the sectional line II—II in FIG. 1, the position sensor having been removed from the hydraulic cylinder in order to simplify representation, FIG. 3 is, as compared to the representation in FIGS. 1 and 2, an enlarged, interrupted sectional view of the left-hand end in FIG. 2 of the piston drawn out of the hydraulic cylinder according to FIG. 1, to which a holding cap is fitted to support the signal element operating in conjunction with the position sensor, FIG. 4 is a perspective view of the piston drawn out of the hydraulic cylinder according to FIG. 1, FIG. 5 is, as compared to the representation in FIG. 3, an enlarged plan view of the holding cap fitted to the piston according to FIGS. 2 to 4 for securing the signal element operating in conjunction with the position sensor, FIG. 6 is a lateral view of the holding cap according to FIG. 5 from the right in FIG. 5, FIG. 7 is a sectional view of the holding cap according to FIG. 5 along the sectional line VII—VII in FIG. 6, FIG. 8 is an enlarged representation of the detail VIII of FIG. 7, FIG. 9 is an enlarged representation of the detail IX of FIG. 7, FIG. 10 is a plan view of a holding cap of alternative design, for supporting a signal element operating in conjunction with a position sensor at the cylinder housing, which cap, provided with an after-running device, can be fitted to a plunger piston, FIG. 11 is a lateral view of the holding cap according to FIG. 10 from the left in FIG. 10, FIG. 12 is a lateral view of the holding cap according to FIG. 10 from the right in FIG. 10, FIG. 13 is a sectional view of the holding cap according to FIG. 10 along the sectional line XIII—XIII in FIG. 10, and FIG. 14 is a sectional view of the holding cap according to FIG. 10 along the sectional line XIV—XIV in FIG. 12.

DESCRIPTION OF THE PREFERRED EMBODIMENTS

FIGS. 1 and 2 show a hydraulic cylinder 10, in the embodiment shown a master cylinder for a hydraulic clutch control for motor vehicles, which cylinder has a piston 12 shown in its normal position, which has a signal element in the form of a ferro-magnetic annular magnet 14 and which is accepted movably in a longitudinal direction in a cylinder housing 16, to which a position sensor 18 is secured. By means of the position sensor 18 the axial position of the annular magnet 14 and therefore of the piston 12 in the cylinder housing 16 can be sensed in known manner. What is significant is that, as will be described in more detail in the following, the signal element respectively the annular magnet 14 is fitted to a holding cap 20 respectively 20', which in turn is fitted to the piston 12.

As can be seen in particular in FIG. 2, the cylinder housing 16 made of a non-ferrous metal in the embodiment shown has at its left-hand end in FIG. 2 a pressure connection 22, via which the hydraulic cylinder 10 can be connected with a slave cylinder (not shown). The cylinder housing 16 is also provided essentially centrally with two fixing flanges 24 formed on opposing sides for fitting to for example a pedal frame (not shown) as well as an after-running connection 26 shown in FIG. 2 at the top, via which the hydraulic cylinder 10 can be connected to a reservoir (not shown). The after-running connection 26 has an after-running channel 28 which leads to a pressure compensation borehole 30 as well as an after-running borehole 32. At the lower side in FIG. 2 the cylinder housing 16 has a bearing surface 34 for the position sensor 18, against which the position sensor 18 abuts across its whole surface in the fitted state shown in FIG. 1. The position sensor 18 which already includes evaluator electronics where appropriate is secured to the cylinder housing 16 in the embodiment shown in FIG. 1 using screws 36, which are screwed into assigned threaded boreholes (not shown) of the cylinder housing 16 and in doing so penetrate respectively grip behind fixing flanges 38 of the position sensor 18. As an alternative to this securing the position sensor 18 might also be locked with the cylinder housing 16 using a snap connection, as is described in more detail in DE 201 16 818 U1 of the applicant, to which reference is hereby incorporated.

At the right-hand end in FIGS. 1 and 2 the cylinder housing 16 has a flange section 40 with a radial groove 42 formed into it on the outer periphery side, which serves to secure an elastomer protective cap 44 shown in the undeformed state in order to simplify the representation. The right-hand end in FIG. 2 of the bellows-type shaped protective cap 44 is fixed on a thrust bolt 46 which is connected firmly on the right-hand side in FIG. 2 with a thrust bolt head 48, which has a connecting eye 50 for connecting to a clutch pedal (not shown). The left-hand end in FIG. 2 of the thrust bolt 46 is provided with a ball shaped head 52, via which the thrust bolt 46 is pivotably connected but so that it is resistant to compression and tension-proof with the piston 12 made of plastic here.

The piston 12 accepted movably in the longitudinal direction in a cylindrical blind hole 54 of the cylinder housing 16 is secured by means of a slotted stop washer 56 in the cylinder housing 16, which washer is secured to a shoulder 60 of the cylinder housing 16 using a retaining ring 58. The stop washer 56 operates in conjunction with a tension stop 62 provided on the thrust bolt 46 as well as a pressure stop 62 also fitted here to the thrust bolt 46, in order to delimit the stroke of the piston 12 in the cylinder housing 16.

In the example shown, the piston 12 has two essentially cylindrical sections 66, 68 which are connected with one another via a connecting section 70 essentially cruciform in cross-section. Each of the cylindrical sections 66, 68 is provided on the outer periphery side with a radial groove 72, 74 of which the left-hand radial groove 72 in FIG. 2 serves to accept a primary sealing element 76 in the form of an elastomer lip seal, whilst a secondary sealing element 78—also in the form of an elastomer lip seal—is accepted in the right-hand radial groove 74 in FIG. 2. The sealing elements 76, 78 are shown in the undeformed state in order to simplify the representation in FIGS. 2 to 4. The primary sealing element 76 delimits in known fashion a pressure compartment 80 communicating with the pressure connection 22 in the cylinder housing 16, whilst an after-running compartment 82 provided between the outer periphery of the piston 12 and the wall of the blind hole 54 is delimited in known fashion by the primary sealing element 76 in FIG. 2 to the left and the secondary sealing element 78 in FIG. 2 to the right.

Finally, the connecting section 70 of the piston 12 is provided, bordering on the cylindrical section 66, with a transversal borehole 84, into which opens a longitudinal borehole 86 extending through the cylindrical section 66. On the left-hand side in FIGS. 2 and 3 of the longitudinal borehole 86 a known, central suction valve 88 follows, whose elastomer valve body 90 is held movably in an axial direction at the piston 12 by means of the holding cap 20 fitted to the pressure compartment-side face surface of the piston 12, as will be described in more detail.

When the master cylinder 10 fitted in the hydraulic clutch control is filled, the pressure compartment 80 communicates in the normal position shown in FIG. 2 of the piston 12 via the pressure compensation borehole 30 and the after-running channel 28 with the after-running tank (not shown) as well as via the suction valve 88, the longitudinal borehole 86 and the transversal borehole 84 with the after-running compartment 82. The after-running compartment 82 itself is connected via the after-running borehole 32 and the after-running channel 28 with the after-running tank. If the piston 12 is now pushed into the cylinder housing 16, in other words to the left in FIG. 2 via the clutch pedal (not shown) articulated to the thrust bolt head 48, the primary sealing element 76 passes over the pressure compensation borehole 30 and so interrupts the hydraulic connection between the pressure compartment 80 and the after-running tank. Due to the pressure building up in the pressure compartment 80 the valve body 90 of the suction valve 88 is pushed against the piston 12 and so prevents the hydraulic fluid from flowing away via the longitudinal borehole 86 and the transversal borehole 84 into the after-running compartment 82, which is now connected with the after-running tank via the after-running borehole 32 and the pressure compensation borehole 30. The pressure setting in the pressure compartment 80 is transferred via the pressure connection 22 and the fluid column between the master cylinder 10 and the slave cylinder (not shown) connected to the pressure connection 22, in order to apply a disengaging force to the dry friction clutch (not shown) operatively connected with the slave cylinder. In doing so, the axial movement of the piston 12 can be sensed through the wall of the cylinder housing 16 by sensing the annular magnet 14 secured to the piston 12 via the holding cap 20 using the position sensor 18 fitted firmly to the cylinder housing 16. The maximum stroke, in other words the position of the piston 12 when it is pushed the furthest into the cylinder housing 16 is indicated in FIG. 2 by the annular magnet 14 represented by a dot-dash line.

If the clutch is released, then the restoring force of the clutch pushes the fluid column back into the master cylinder 10. If, as can be caused, for example, by a return spring (not shown) on the clutch pedal, the piston 12 of the master cylinder 10, which piston is drawn via the thrust bolt 46 in this case, precedes this return flow movement, negative pressure occurs in the pressure compartment 80 of the master cylinder 10 and in the piping system leading to the slave cylinder. Due to the pressure difference which then prevails between the two sides of the valve body 90 of the suction valve 88, the axially movable valve body 90 lifts away from the piston 12 and opens the longitudinal borehole 86 in the piston 12. Hydraulic fluid then flows into the pressure compartment 80 from the after-running compartment 82 via the transversal borehole 84 and the longitudinal borehole 86 in the piston 12. As soon as the difference in pressure between the two sides of the valve body 90 is equalized, the surplus volume of hydraulic fluid that has flowed in thus flows through the pressure compensation borehole 30 which is now open again, in other words traveled over by the primary sealing element 76 to the right in FIG. 2 and back into the compensating tank.

FIGS. 3 and 5 to 9 show details of the holding cap 20 which is fitted to the piston 12 by means of a snap connection and is preferably injection-molded of plastic, and to which the annular magnet 14 is also fitted by means of a snap connection in the example shown. In accordance with FIG. 7 in particular the holding cap 20 has an inner, essentially hollow cylindrical hub section 92 and an outer, essentially hollow cylindrical hub section 94, the inner hub section 92 being connected with the outer hub section 94 by a ring section 96.

As can be seen in FIGS. 3 and 7, the inner hub section 92 projects over the ring section 96 in both directions, in other words to the right and to the left in FIGS. 3 and 7. The region of the inner hub section 92 projecting over the ring section 96 to the left in FIGS. 3, 5 and 7 is slotted to form, in the embodiment shown, four snap segments 98, starting from the free end in even angular distances. The snap segments 98 serve to secure the annular magnet 14 to the holding cap 20, as FIG. 3 shows. For this purpose each snap segment 98 has at its free end, in other words the end facing away from the ring section 96 on the outer periphery side a nose 100 which projects radially outwards and which is provided on its side facing away from the ring section 96 with a joint bevel 102 for joining the annular magnet 14. When the annular magnet 14 is fitted to the holding cap 20, in which state the annular magnet 14 abuts the ring section 96 of the holding cap 20 across its full surface in accordance with FIG. 3, the noses 100 of the snap segments 98 grip behind the annular magnet 14 and so hold it in a form-closing manner and essentially free from play to the holding cap 20.

The region of the inner hub section 92 which projects in FIGS. 3 and 7 to the right over the ring section 96 of the holding cap 20 forms a hollow cylindrical guide section 104 for the axial guidance of the valve body 90, which in accordance with FIG. 3 encompasses a cylindrical extension 106 of the valve body 90 concentrically with little radial play, so that the valve body 90 can execute a movement in an axial direction. The guide section 104 of the holding cap 20 has at its free end, in other words the end facing away from the ring section 96, a circular ring shaped face surface 108, which forms a stop for the valve body 90 in its suction position as shown in FIG. 3.

The outer hub section 94 of the holding cap 20 extends from the ring section 96 in one direction only, in other words to the left in FIGS. 3, 5 and 7. The outer hub section 94 is also slotted at even angular distances to form three snap sections 110 in the embodiment shown, starting from its free end, in other words from the right in FIGS. 3, 5 and 7. The snap segments 110 serve to secure the holding cap 20 to the piston 12, as shown in FIG. 3. To do this, each snap segment 110 has at its free end, in other words the end facing away from the ring section 96, on the inner periphery side a nose 112 projecting radially inwards. Each of the noses 112 is, as FIG. 8 in particular shows, on its side facing away from the ring section 96, provided with a joint bevel 114, which facilitates the fitting of the holding cap 20 to the piston 12. When the holding cap 20 is fitted to the piston 12 the noses 112 of the snap segments 110 engage in accordance with FIG. 3 in a radial grove 116 formed into one pressure compartment-side end of the cylindrical section 66 of the piston 12 on the outer periphery side, in order to secure the holding cap 20 in a form-closing manner to the piston 12. Furthermore, the nose 112 of the respective snap segment 110 which nose engages in a form-locking manner in the radial groove 116 provided at the piston 12 has on its side facing away from the piston 12 respectively facing the ring section 96 a sloping face or bevel 118, which operates in conjunction with a complementarily formed sloping face or bevel 120 at the radial groove 116 of the piston 12, in order to hold the holding cap 20 free from play on the piston 12. To be more precise, the holding cap 20, under the spring action of the snap segments 110, is drawn via the sloping faces 118 and 120 against the flank 122 of the radial groove 116 of the piston 12, which flank is located on the right hand side in FIG. 3 and extends perpendicularly in relation to the center axis of the piston 12. A defined position of the annular magnet 14 in relation to the piston 12 is achieved simply as a result. No further explanation is required for the fact that clearly-defined position relations between the piston 12 and the annular magnet 14 on the one hand and the cylinder housing 16 and the position sensor 18 on the other hand are preconditions for values being capable of being sensed using the position sensor 18, which values are representative of the actual engaging or disengaging travel of the clutch respectively of the state of wear on the clutch.

At the free, in other words at the right-hand end in FIGS. 5 and 7 of the snap segments 110 of the holding cap 20, the snap segments 110 are also provided on the outer periphery side respectively with a curved projection 124, which projects from the outer hub section 94 in a radial direction by a pre-determined amount, as FIG. 8 in particular shows. By the projections 124 the holding cap 20 and therefore the piston 12 when the piston 12 is fitted in the cylinder housing 16 is centered in relation to the blind hole 54 in the cylinder housing 16, so that the annular magnet 14, which essentially corresponds in the outer diameter to the outer hub section 94 of the holding cap 20, cannot come into contact with the wall of the blind hole 54. The projections 124 also make for a defined annular gap between the wall of the blind hole 54 and the outer periphery of the outer hub section 94 of the holding cap 20. Through this annular gap hydraulic fluid can reach the suction valve 88 from the pressure compartment 80 and vice versa via the slots between the snap segments 110 of the outer hub section 94 of the holding cap 20.

The holding cap 20 formed in one piece is also, as FIGS. 6, 7 and 9 in particular show, reinforced by means of a plurality, in the embodiment shown, nine ribs 126, which are evenly distributed over the periphery and extend between the outer periphery of the inner hub section 92 and the inner periphery of the outer hub section 94 along the side of the ring section 96 facing the piston 12. The ribs 126 prevent undesired deflection of the holding cap 20, which would be detrimental to a defined position relation between the annular magnet 14 and the piston 12.

Finally, with respect to the known suction valve 88 and with reference to FIG. 3 it should be mentioned that the valve body 90 provided with a low-pressure and a high-pressure seal 128 respectively 130 operates in conjunction with a sealing seat 132 formed on the piston side, the valve body 90 being reinforced on the piston side with a metal supporting cup 134, which also guides the valve body 90 on the piston side in an axial direction in an enlarged-diameter bore-hole section 136 of the longitudinal borehole 86.

Although the use of the holding cap 20 has been described in the above embodiment in connection with a "conventional" piston 12 as an example, which piston has two sealing elements 76, 78 which operate in conjunction with a housing-side sliding surface, it is clear to the person skilled in the art that the holding cap 20 could also be used on a so-called "shaft piston", in which a housing-tight (secondary) sealing element operates in conjunction with a sliding surface provided on the piston shaft, whilst a (primary) sealing element fitted to the piston head operates in conjunction with a housing-side sliding surface.

FIGS. 10 to 14 show a holding cap 20', which can be used on a so-called "plunger piston", in which two or more housing-tight sealing elements (not shown) operate in conjunction with a sliding surface (not shown) provided on the piston side. The parts respectively sections corresponding with the parts respectively sections in accordance with FIGS. 5 to 9 are provided with the same reference numerals, supplemented by a mark ('), and are only described in the following insofar as they differ from the preceding embodiment, respectively in so far as would appear to be necessary for comprehending the second embodiment. With this embodiment, and for the sake of simplicity, full representation of the hydraulic cylinder with cylinder housing and piston has also been dispensed with, as this can be designed mainly as described in detail in the applicant's DE 100 28 673 A1, and to which reference is specifically made in this respect. It should only be mentioned in this connection that a receptacle for the position sensor 18 must be provided in addition on the cylinder housing in accordance with DE 100 28 673 A1, which can be formed as disclosed, for example, in DE 201 16 818 U1 of the applicant, to which specific reference is also made in this respect.

With the embodiment in accordance with FIGS. 10 to 14 the holding cap 20' holding the signal element on the piston does not also serve as a holder for a central suction valve, as described on the basis of the preceding embodiment. Instead, the holding cap 20' is provided with an after-running device 138, which has a plurality of compensating grooves 140 distributed over the periphery of the outer hub section 94' and which extend at least on the cylindrical outer periphery surface on the piston-side end of the outer hub section 94' in an axial direction. When the piston is in the normal position, the compensating grooves 140 provide underneath the housing-side primary sealing element respectively through it a connection between a pressure compartment and an after-running area of the master cylinder. When the piston is in an operating position the primary sealing element operating in conjunction with the piston-side sliding surface seals the pressure compartment variably delimited by the piston in the cylinder housing from the after-running area. The after-running device 138 will not be described in more detail at this point, as it essentially corresponds as regards structure and function with the after-running device described in detail in the applicant's DE 100 28 673 A1, to which specific reference is made herewith in this respect.

With this embodiment the holding cap 20' is secured by means of the inner hub section 92' to a fixing shoulder (not shown) of the piston, the diameter of the fixing shoulder being smaller in relation to the piston sliding surface, for which the inner hub section 92', starting from its end facing the piston, is slotted to form several, eight in the embodiment shown, snap segments 110' distributed evenly over the periphery. As in the preceding embodiment, the snap segments 110' each comprise a nose 112' projecting radially inwards and having a piston-side joint bevel 114' and a bevel 118' facing away from the piston. The noses 112' operate with their bevels 114', 118' in accordance with the preceding embodiment in conjunction with a radial groove (not shown) formed on the fixing shoulder of the piston, in order to hold the holding cap 20' in a form-locking manner and essentially free from play on the piston.

In contrast to the embodiment described with reference to FIGS. 1 to 9, the signal element in the second embodiment is held in place by means of the outer hub section 94' of the holding cap 20'. To do this, the outer hub section 94', instead of the inner hub section, projects over the ring section 96' on the side facing away from the piston of the ring section 96' and is, starting from the face side facing away from the piston of the outer hub section 94', repeatedly—three times in the embodiment shown—slotted to form three snap segments 98'. Each snap segment 98' has, at its free end, in other words the end facing away from the ring section 96', on the inner periphery side a nose 100' projecting radially inwards and having a joint bevel 102' for the signal element. The noses 100' grip behind the signal element when it is fitted to the holding cap 20' and hold the signal element essentially free from play against shoulders 142, which are formed on the inner periphery side at the snap segments 98'.

In summary, a hydraulic cylinder, in particular a master or slave cylinder for a hydraulic clutch control for motor vehicles, is disclosed, which has a piston, to which a signal element is assigned and which is accepted movably longitudinally in a cylinder housing, at which a position sensor is secured, by means of which an axial position of the signal element and therefore of the piston in the cylinder housing can be sensed. According to the invention the signal element is fitted to the piston by means of a holding cap. As a result, a hydraulic cylinder is created with a device for sensing the piston position, in which the signal element of the sensing device, which signal element operates in conjunction with the position sensor on the cylinder housing, can be fixed in a simple manner on the piston, which also enables the signal element to be sized largely independently of the piston geometry. In particularly preferred embodiments the holding cap for the signal element is at the same time a function carrier for further function sections of the piston, for example, for a central suction valve on a conventional piston or on a shaft piston or for an after-running device on a plunger piston.

What is claimed is:

1. A hydraulic piston-and-cylinder arrangement, with a piston, which has a signal element and which is movably in a longitudinal direction accepted in a cylinder housing, to which a position sensor is secured, by means of which an axial position of the signal element and therefore of the piston in the cylinder housing can be sensed; wherein the signal element is secured to a holding cap, which in turn is fitted to the piston, and wherein the holding cap is fitted to a pressure compartment-side face surface of the piston.

2. A hydraulic piston-and-cylinder arrangement according to claim 1, wherein the holding cap is fitted to the piston by means of a snap connection.

3. A hydraulic piston-and-cylinder arrangement according to claim 1, wherein the signal element is secured to the holding cap by means of a snap connection.

4. A hydraulic piston-and-cylinder arrangement according to claim 2, wherein the holding cap has an inner hub section and an outer hub section connected with it via a ring section, each hub section having a plurality of snap segments, by means of which the signal element is secured to the holding cap and the holding cap is fitted to the piston, respectively.

5. A hydraulic piston-and-cylinder arrangement according to claim 4, wherein each snap segment has a free end forming a nose projecting radially and being shaped to engage in a form-locking manner in a radial groove provided on the piston and grips behind the signal element, respectively.

6. A hydraulic piston-and-cylinder arrangement according to claim 5, wherein the nose projects radially inwards.

7. A hydraulic piston-and-cylinder arrangement according to claim 5, wherein the nose projects radially outwards.

8. A hydraulic piston-and-cylinder arrangement according to claim 5, wherein the nose of the respective snap segment, which nose engages in a form-locking manner in the radial groove provided on the piston, is provided with a bevel on its side facing away from the piston.

9. A hydraulic piston-and-cylinder arrangement according to claim 1, wherein the piston has a central suction valve with a valve body, the valve body being held on the piston by means of the holding cap.

10. A hydraulic piston-and-cylinder arrangement according to claim 9, wherein the holding cap has an inner hub section which has a guide section for guiding the valve body.

11. A hydraulic piston-and-cylinder arrangement according to claim 10, wherein the guide section of the holding cap encompasses concentrically a cylindrical extension of the valve body with little radial play.

12. A hydraulic piston-and-cylinder arrangement according to claim 10, wherein the guide section of the holding cap has a face surface, which forms a stop for the valve body in its suction position.

13. A hydraulic piston-and-cylinder arrangement according to claim 1, wherein the piston in the cylinder housing variably delimits a pressure compartment and has a sliding surface for a housing-side sealing element, which seals the pressure compartment when the piston is in an operating position, the holding cap being provided with an after-running device, which, when the piston is in a normal position, connects the pressure compartment underneath the sealing element with an after-running area.

14. A hydraulic piston-and-cylinder arrangement according to claim 13, wherein the holding cap has an outer hub section which has a cylindrical outer periphery surface against which the sealing element abuts when the piston is in the normal position and which is provided with several compensating grooves distributed over the periphery, which extend, when the piston is in the normal position, in an axial direction underneath the sealing element.

15. A hydraulic piston-and-cylinder arrangement according to claim 1, wherein the signal element is a permanent magnet.

16. A hydraulic piston-and-cylinder arrangement according to claim 1, wherein the signal element is a ferromagnetic annular magnet.

17. A hydraulic piston-and-cylinder arrangement according to claim 1, wherein the holding cap is made of plastic.

18. A hydraulic piston-and-cylinder arrangement according to claim 1, wherein the holding cap is made of injection-molded plastic.

19. A hydraulic piston-and-cylinder arrangement according to claim 1, wherein the hydraulic piston-and-cylinder arrangement is a master piston and cylinder for a hydraulic clutch control for motor vehicles.

20. A hydraulic piston-and-cylinder arrangement according to claim 1, wherein the hydraulic piston-and-cylinder arrangement is a slave piston and cylinder for a hydraulic clutch control for motor vehicles.

* * * * *